Jan. 5, 1965   K. D. WILKE   3,163,886
APPARATUS FOR MANUFACTURING LIGHT CONSTRUCTION PANELS
Original Filed Aug. 9, 1960   2 Sheets-Sheet 2
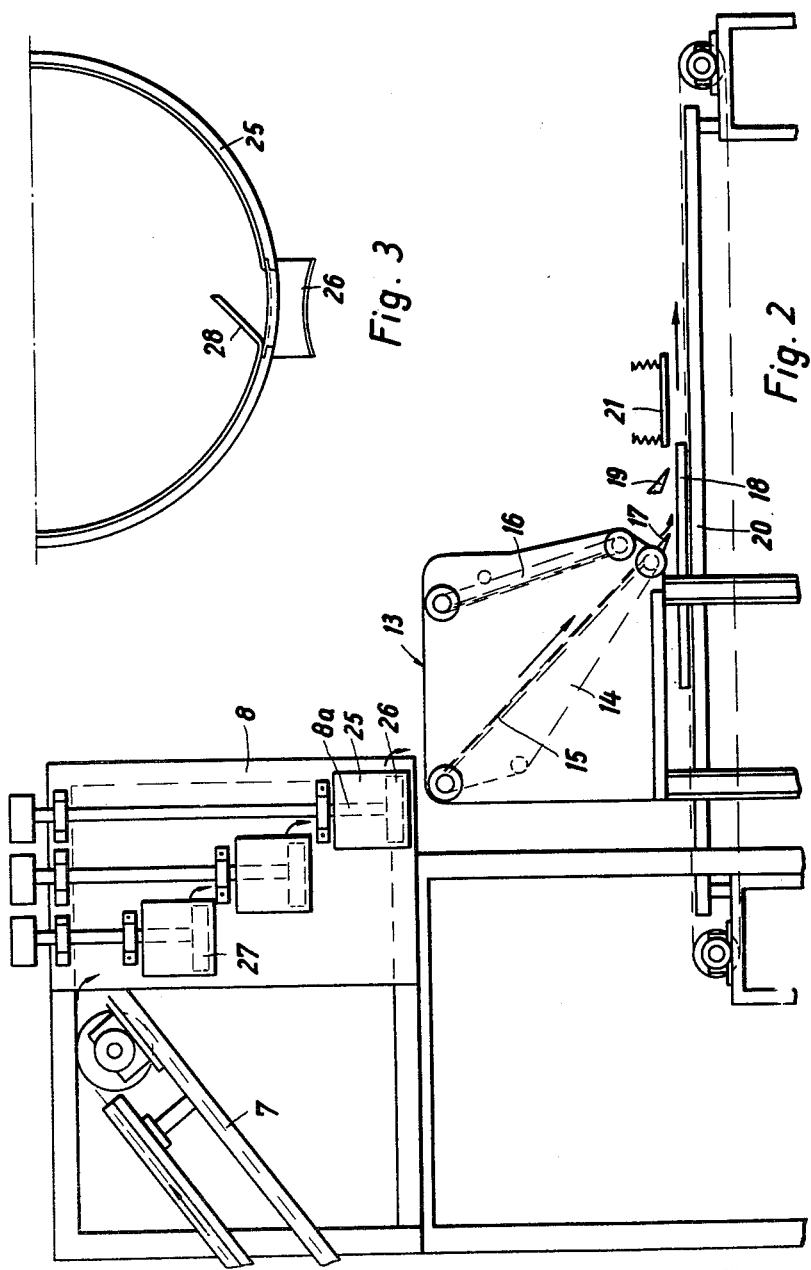
Inventor:
KLAUS DIETER WILKE
By Reynolds + Christensen
Attorneys _United States Patent Office_ 3,163,886
Patented Jan. 5, 1965

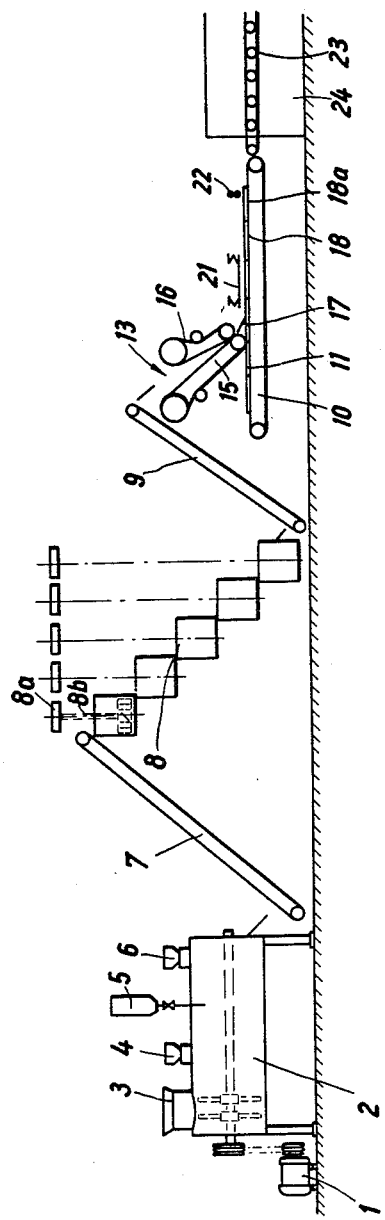

3,163,886
APPARATUS FOR MANUFACTURING LIGHT
CONSTRUCTION PANELS
Klaus Dieter Wilke, Bahnhofstrasse 32,
Herzberg, Germany
Original application Aug. 9, 1960, Ser. No. 48,429.
Divided and this application July 24, 1961, Ser. No. 126,335
6 Claims. (Cl. 18—4)

This invention pertains to a device for manufacturing thin light construction plates or panels of a particlar fibrous material with sorel cement, according to a process described in my application Serial No. 48,429, filed August 9, 1960, from which this application is divided.

Processes for manufacturing a porous building material are known, in which a foam forming agent is mixed with a watery solution of magnesium chloride, and subsequently a synthetic resin and/or a bitumen together with magnesium oxide and an organic and/or inorganic filling material are added.

The process according to this invention consists in mixing a particular fibrous material, for instance wood defibrator substance, with a proportionate amount of magnesium sulfate solution, dry magnesium oxide (or other forms of sorel cement), and a forming agent, to form a damp crumbly mass, which then is caused to foam, after which, upon adding a stabilizer of a dispersion of plastic, is shaped in a continuous operation into preferably very thin bodies or panels with large surfaces, whereafter drying takes place at a temperature over 212° F.

The advantage of the process according to the invention consists in producing an easily handled mass which, after adding the spongy or foam forming substance, dry or dispersed in a spongy plastic, is thoroughly but gently mixed with the fibrous substance and the sorel cement, without forming foam in this crumbly condition. Foaming will begin only after vigorous stirring begins, and after addition of the stabilizer, but then no further mechanical treatment is required except the shaping into large thin plates or panels and the setting of the same, and there is thus no appreciable increase in its attained low density.

What is new and progressive about the process is considered to lie in the technical recognition that the foaming agent can be mixed into a dispersion of synthetic resin without immediately effecting foaming. As long as mixing takes place, as distinguished from vigorous stirring, the formation of foam should be insignificant. The then following formation of foam, it is true, is attained by stirring, as the last step, however, of the mechanical treatment. This has the advantage that the degree of foam formation may be chosen at will, it being possible, too, by addition of a stabilizer and by setting the formed mass, to stop such foaming at the most favorable moment, and by avoidance of compressive mechanism in the forming, but rather by containing it against its inherent tendency to spread, to retain it at the desired porosity or density when set.

The process, as described in the parent application referred to above, is preferably carried out in the following manner:

The filling material, wood defibrator substance, is mixed with the appropriate amount of salt solution (for example, magnesium sulfate), and magnesium oxide (for instance, from magnesite or dolomite and usually added dry), the two constituting one type of sorel cement, and the foamer. The result is a damp, crumbly susbstance. Then after adding the stabilizer (for instance urea formaldehyde resin) the mixture is vigorously stirred or otherwise mechanically made to foam up, until the most favorable degree of foam is reached. The foam thus produced is very stable. The formation of the foam takes place in the slightly moist mass and produces very little internal friction. As soon as the most favorable degree of foam is attained, the plates are spread as a blanket upon a molding conveyor, and the blanket is severed to form individual plates. In doing this, the degree of foam does not diminish noticeably. The plates obtained are dried at a temperature of over 212° F., preferably at 320° F. They are then ready for use.

Examples of formulae and procedures are set forth in the parent application, and need not be repeated in this specification, which pertains to mechanism for use in carrying out the process.

The thin light weight panels manufactured according to this invention contain 2% to 4% of moisture after drying. Their specific gross weight is between 0.203 and 0.260 oz. per cubic inch, and their bending strength is about 356 lbs. per square inch. The total volume of pores is about 87%, of which 7% are intracellular.

The plates will neither shrink nor swell under the influence of moisture. They will keep exactly any shape in which they have been cast or spread. They are at least flame retardant and by incorporation of known agents can be made non-inflammable. They are not subject to afterglows.

The panels manufactured according to the invention resemble, in consequence of their consisting primarily of wood fibers, the familiar fiberboard insulating panels in their morphological composition. As to their dimensions, too, which may amount to several yards of length and width and go down to a fraction of an inch in thickness, they resemble said fiberboard insulating panels. They will flex similarly to fiberboard panels, without breaking. Just like them, they can be transported and used for building.

As distinct however from these familiar fiberboard insulating panels they consist of wood fiber with mineralized surfaces and mineral coherence. They possess a very high porosity, surpassing that of a fiberboard insulating panel considerably. Chiefly, however, according to the novel process of manufacture a mechanically firm panel is produced, to which can be given in the course of their manufacture any desired shape, and surface finishes or treatments of various kinds. The capillary porosity extending from one side to the opposite side amounts to 80% of the total volume, as compared to about 50% with the usual fiberboard insulating panel. This porosity, so essential for sound attenuation, will remain unimpaired if provided with suitable surface finishes.

In the course of the manufacture of the panel the latter may be given a smooth, up to very rough and irregular, surface, even full of fissures, just as desired by the user. The panels may be given a variety of surface treatments, having grooves, pimples, or also more or less regular surface pits. All these fashionings can be carried out very accurately, without impairing the scheme of the pores. The fashionings remain after drying and setting.

The novel bodies may, if necessary, be given polished surfaces. They may be machined with usual tools, and are nailable. Screws will have firm holds in them.

For carrying out the manufacturing process described and claimed in the parent application, a device has proved to be especially favorable which is distinguished by a whirlpool mixer in which the fibrous substance, first mixed with one or both of the powdery mineral constituents of the sorel cement, and some water, and then with a foam forming agent, is stirred vigorously, as by a multistage stirring cascade that will cause the appropriately moist crumbly mass to foam on addition of a stabilizer. The issuing rope of material is then supported by a sieving molding machine for shaping the mass to thin panels of large surface area, as well as by attached conveying sieves for forwarding the panels to a conveyor and through a drier that delivers the now set panels ready for use.

In the drawing, a novel apparatus for manufacturing the thin light weight panels is shown schematically.

FIGURE 1 is a total side view.

FIGURES 2 and 3 show details on a larger scale.

A motor 1 drives a whirlpool mixer 2 of known construction into which the fibers are supplied from a hopper 3. The filling opening 4 is used to admit the magnesite, the filling opening 5 for the salt solution, and the filling opening 6 for the foaming agent.

From the whirlpool mixer a conveyor 7, for instance a conveyor belt, leads for conveying the moist, crumbly material to a stirring cascade 8, which in the embodiment of FIGURE 1, consists of five stirrers. From the lower stirrer the material is transported by means of conveyor 9 to a sieving apparatus 10, that is provided with conveying sieve frames 18. Beyond these there is a drying tunnel 24.

This device works in detail as follows:

The basic substances (fiber, magnesite or dolomite, salt in a watery solution, and foaming agents by choice) are thoroughly but not vigorously mixed in the continuously working whirlpool mixer 2. The ingredients to be mixed are fed in echelon formation and in carefully regulated proportions, so that the fibrous material, at first alone and loosened, is put in at 3, then the dry magnesite at 4 and the salt solution at 5 (or vice versa), and optionally at last, the foaming agent at 6. The material leaving the mixer at its exit is damp and crumbly having been moistened by the salt solution last added. For conveyance to the next stirring cascade either free fall will serve, or a slanting chute or an ascending conveyor belt 7.

The stirring cascade 8 (FIGURE 2) consists of several, for example, five pots 25, arranged each below the next, with stirring apparatuses 8a, driven singly or in common. The pots 25 (FIGURE 3) have laterally arranged apertures 26, located several inches above the impellers 27. Within the apertures 26 baffles 28 are arranged in positions inclined obliquely to the sense of rotation of the respective stirring tools 8a. These baffles, in consequence of the stirring effect at the outside wall of pot 25 will peel out in the shape of an endless rope the more or less foamy substance ascending on the outside wall of pot 25, and travelling slowly in the direction of rotation, and will carry it out through aperture 26 according to the overflow principle. In consequence of free fall or movement over inclined chutes this rope is transmitted to the central whirlpool of the following pot 25. The dimensions of the baffles 28 and the aperture 26 are adapted to the foaming intensity or the foam volume, increasing from pot to pot. In one of the pots 25, preferably the first, the stabilizer is added as the final ingredient. The stirring tools 8a should appropriately be given an inclined position, so that they produce a central undertow. It is advantageous to let the rotary speed increase from pot to pot. From the last pot the substance, made foamy completely in the desired degree, is transmitted, again by free fall or by means of conveyor belt 9, to the subsequent sieve molding machine 10 in the form of an endless rope.

The limited stability of the mechanically produced foam forbids any somewhat sharp strain or pressure while it is being shaped to a panel or the like. The continuous mode of working, on the other hand, requires the forming of an endless band of the desired width and thickness. The customary modes for forming, as for instance extruding, are not applicable, because these expose the mass to be shaped to mechanical pressure, for instance by pistons or worm gear. In the present case this would lead to destruction of foam and a corresponding reduction of its volume, undesirably increasing its density. The conventional principle of the belt press, too, subjects the passing material to a counterpressure and is therefore not applicable. It is found, however, that it is possible to form a satisfactory endless band from said mass without impairing its foaminess or even leading to dehydration of the substance, if the molding machine 10 is built as described in the following.

A chute 13 lying flat or standing more or less upright, having the width of the desired path, converges transversely to such path, up to the desired panel thickness, on its course to the outlet. Appropriately one of the bottom walls 14 becomes plane and is arranged at an inclination of 30°, the convergent wall however being slightly bent, so that its tapering decreases on its way. Over the board walls of the chute taut sieves 15, 16 (for example, with 6 meshes per half inch) are led, circulating in the direction towards the outlet and having the desired speed of advance. The jaws or walls limiting the chute laterally are appropriately left bare and are arranged to be adjustable for the purpose of regulating the width of the path. The material arriving in appropriately apportioned quantities from the stirring cascade 8 will fall on the lower sieve 15, moving away from the cascade, and, as it advances towards the bottom of the chute, inherently tends to spread over the full width of a so to say homogeneous path, without affecting the foam to an appreciable extent. Excessive quantities of foam substance are at the same time easily held back in chute 13.

The mass leaving the outlet is there received from the sieves 15, 16 by means of a short, blank lip 17 and transmitted to the transporting sieve frame 18 of any suitable length, for instance one to two yards, in endless succession, with appropriate speed of advance. Lip 17 is quite important, being for the purpose of preventing tearing of the course of material when transmitted and changed in direction from somewhat vertical to horizontal.

In order to protect the foam substance in the forming sieve apparatus 10 especially well from compression, it has proven to be practical to distribute the substance arriving in an endless strand by a traversing or laterally reciprocating bar 19 of a length roughly equal to the whole width of the course, that is arranged beyond the transmitting lip 17.

Furthermore it was found that perhaps also the insertion of a single circulating sieve 15 in the chute 13, on the bottom thereof, and omitting the sieve 16, will suffice for the desired shaping. In this case the upper sieve 16 is replaced by a slightly convex wall of the chute.

The advancing sieves 15, 16 in their circulation are made to pass a sieve-washing device of known design, for the purpose of clearing the sieving device of excess material, by which it would gradually become clogged with dead or hardened substance. This known sieve-washing device is not illustrated in the drawing, in order not to impair the clearance of the latter. The mass of material leaving chute 13 at its outlet has, after passing through the terminal lip 17, an inherent tendency to spread or grow wider and thus to decrease in thickness at its sides. In order to avoid this tendency to vary in thickness it is appropriate to provide guide plates standing laterally of the path and limiting the width of the latter. Smoothing the surface, i.e., equalizing the waves affecting the fluctuation of the thickness of the mass, becomes possible in a surprisingly simple manner by means of an elastically resiliently supported thin plate 21, of an extent of eight to eleven inches in the direction of travel, of the desired thickness and vertical spacing, extending over the entire path. By pressure rollers, on the other hand, running in either direction, no satisfactory smoothness could be attained, but merely an increase in density.

From sieve frame 18 to sieve frame 18a the band formed by the substance is finally cut to length by means of a wire 22 or some other kind of cutting tool. For cutting to length and severing the path at the two edges of the several sieve frames 18, 18a, vertical strips of sheet iron may be placed, which in connection with the described smoothing plate 21, make a clean severing of the band possible, and furthermore permit preserving the crude panel of its full attained total length and thickness, and thus avoiding loss of material by the necessity of trimming the edges.

The loaded sieves 18, 18a, the outstanding quality of which is their rigidity, subsequently travel on an endless transfer chain or similar conveying device 23 through a drying tunnel 24 or the like of known construction, with also known ventilation (not shown in the illustration).

As the bottom surface of the panels is at a disadvantage with regard to the speed of drying, compared with the upper surface, it is recommended to make up for this by resorting to outright undergrate firing, so as to obtain dry panels free of stress.

Using a number of single sieve frames 18, 18a in constant succession below the discharge of the material is only one of the possible embodiments of the invention and offers itself especially for small plants. The basic requirement of the conveying sieve is its rigidity, making it possible to forward the substance up to the point of its setting and solidification, shockness and free from distortions.

The effect of the sieve boxes may also be carried out in accordance with the invention by means of a taut endless sieve belt, that conveys the soft substance through an extremely hot preliminary drying zone, in which the band will become sufficiently hard to allow its being taken from the sieve as an already firm body, and completing its drying over a roller table in the further drying tunnel.

I claim as my invention:

1. Mechanism for continuously foaming a mass of foam-forming material that is inherently spreadable but non-fluid, to decrease its density to a desired value, and then to form the same continuously into a thin broad sheet, said mechanism comprising a plurality of stirrers arranged in cascade, each including a generally cylindrical pot having a side outlet above its bottom, a unidirectionally rotative stirring device located generally below its outlet, whereby the mass is moved from its center and about the inside peripheral wall of the pot, a baffle at the outlet projecting into the path of the rotating mass and inclined relative to its direction of rotation, and of a size proportioned to intercept from the mass and to divert through its outlet a substantially continuous rope from the mass, to fall freely into the next lower pot, an inclined chute arranged to receive the rope exiting from the lowermost pot, for its movement down the chute at least in part by gravity, said chute being arranged to guide such movement while the rope spreads and thins generally to the desired width and thinness, and horizontal conveying means advancing beneath the chute's lower end at a rate consonant with the rate of advance of the material delivered from the chute to receive and advance the eventual thin broad sheet.

2. Mechanism as in claim 1, wherein the outlet of each pot that is above another pot is located to deliver the rope of foamy material substantially into the center of the pot below, whereby undertow from the stirring device in the lower pot will drag the material outwardly towards the pot's inside peripheral wall.

3. Mechanism as in claim 1, including a resiliently supported surface-smoothing plate disposed sufficiently above the path of the horizontal conveying means to contact lightly the upper surface of the thin broad sheet, and to smooth such surface without appreciable densifying effect upon the sheet.

4. Mechanism as in claim 1, wherein the chute includes an inclined sieve-like conveyor positioned to receive the rope issuing from the lowermost pot, a cooperating sieve overlying said sieve-like conveyor and converging towards the same at their lower ends to a spacing not less than the desired thickness of the eventual sheet, and advancing at the same rate as the sieve-like conveyor.

5. Mechanism as in claim 4, including further a lip underlying the exit from the chute, and supporting the material issuing from the chute as it is deposited upon the horizontal conveying means.

6. Mechanism as in claim 1, including a bar supported above the horizontal conveying means at a distance to contact the upper surface of the sheet, and vibratory laterally of its path of advance to distribute the foamy material evenly laterally.

References Cited in the file of this patent

UNITED STATES PATENTS

| | | |
|---|---|---|
| 1,540,650 | Prather | June 2, 1925 |
| 1,988,315 | Jackson | Jan. 15, 1935 |
| 2,101,031 | Little | Dec. 7, 1937 |
| 2,475,191 | Marvin et al. | July 5, 1949 |
| 2,540,354 | Selden | Feb. 6, 1951 |
| 2,622,302 | Blecko | Dec. 23, 1952 |
| 2,697,247 | Bettes | Dec. 21, 1954 |
| 2,716,070 | Seipt | Aug. 23, 1955 |
| 2,728,939 | Behr | Jan. 3, 1956 |
| 2,756,459 | Kellner | July 31, 1956 |
| 2,858,594 | Eirich et al. | Nov. 4, 1958 |
| 2,912,738 | Bergling et al. | Nov. 17, 1959 |
| 2,962,785 | Young | Dec. 6, 1960 |
| 2,989,775 | Pakarek | June 27, 1961 |
| 3,042,988 | Goransson et al. | July 10, 1962 |